United States Patent
Ishizaka (10) Patent No.: US 8,072,969 B2
(45) Date of Patent: Dec. 6, 2011

(54) VOIP TERMINAL SPEECH QUALITY CONTROL SYSTEM AND METHOD

(75) Inventor: Tetsuya Ishizaka, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 1346 days.

(21) Appl. No.: 11/668,961

(22) Filed: Jan. 30, 2007

(65) Prior Publication Data
US 2007/0189281 A1    Aug. 16, 2007

(30) Foreign Application Priority Data
Jan. 30, 2006   (JP) ................. 2006-019988

(51) Int. Cl.
*H04L 12/66* (2006.01)
*H04L 12/28* (2006.01)
*H04M 1/00* (2006.01)
(52) U.S. Cl. ......... 370/356; 370/389; 370/392; 379/162
(58) Field of Classification Search .......... None
See application file for complete search history.

(56) References Cited

FOREIGN PATENT DOCUMENTS

| JP | 5-206937 A | 8/1993 |
|----|-----------|--------|
| JP | 5-284097 A | 10/1993 |

*Primary Examiner* — Melanie Jagannathan
(74) *Attorney, Agent, or Firm* — Sughrue Mion, PLLC (57) ABSTRACT

A handover source AP among APs in a system has a RAM 203 storing a MAC address of a VoIP terminal performing a VoIP communication, holding status information indicative of a holding state, and data on the number of in-call terminals. A CPU 202 monitors all transmitting/receiving frames and packets of a VoIP terminal connected to a LAN so as to judge whether or not the connected VoIP terminal is disconnected. When the terminal is disconnected, it is judged whether or not a MAC address of the disconnected VoIP terminal is stored in the RAM 203 and whether or not holding status information is stored in the RAM 203. When the MAC address is stored in the RAM and the holding status information is detected, a holding notification request command is transmitted to all APs. When the terminal is not disconnected, it is judged whether or not a holding notification response command is present in the packet. When the command is present, the holding status information is deleted and the number of in-call terminals is reduced.

17 Claims, 6 Drawing Sheets

VOIP TERMINAL SPEECH QUALITY CONTROL SYSTEM AND METHOD

This application claims priority to prior Japanese patent application JP 2006-19988, the disclosure of which is incorporated herein by reference.

BACKGROUND OF THE INVENTION

This invention relates to a VoIP terminal speech quality control system and method that can guarantee speech quality without failing in switching back even if a VoIP terminal is resumed after holding and further that can secure a speech band at a handover destination AP even if the VoIP terminal hands over during holding, thereby guaranteeing speech quality without failing in switching back even if the VoIP terminal is resumed after the holding, and further relates to a program that causes a computer to execute such a method and a recording medium recording such a program.

In real-time communications such as VoIP (Voice over IP) communications in the conventional wireless LAN (Local Area Network) system, a band of an access point (hereinafter referred to as an "AP") is congested to cause delay or discard of packets as the number of communications increases, so that there occurs a phenomenon such as pauses in communication. Therefore, it has been difficult to perform comfortable communications.

For solving such a problem, there is known, for example, a technique that provides a limit to the number of VoIP calls under the control of the same AP and transmits a Dis-Association frame to an outgoing call (or an incoming call) of a VoIP terminal exceeding the limited number to refuse communication, thereby preventing exceeding the limited number to realize high-quality speeches.

That is, under the control of the AP having the call number control function, holding is not recognized as a call and, when the number of calls reaches the maximum, i.e. the limited number, a call is disconnected or released after resumption subsequent to the holding.

As related prior art, see a prior art document (Japanese Unexamined Patent Application Publication No. Hei 05-284097).

However, the foregoing conventional technique has the following problems.

In an environment where a single AP is present, a RTP (Realtime Transport Protocol) communication is not performed when a terminal is in holding. Therefore, the number of calls is reduced by one. Then, when the number of calls reaches the maximum during the holding, a Dis-Association frame is sent in reply to an outgoing call (or an incoming call) in resumption subsequent to the holding, so that a handover occurs. Accordingly, after AP searching, a Dis-Association frame is received again and, finally, switching back is disabled due to time-out. This problem is solved if the AP has a SIP (Session Initiation Protocol) proxy function. However, adding the SIP proxy function to the AP causes a high cost due to advanced hardware functionality. Further, there also arises a problem that connectable SIP servers are limited.

On the other hand, in an environment where a plurality of APs are present, when a terminal hands over from one AP to another during holding, if the number of calls is full at the handover destination AP, resumption after the holding is disabled and thus the communication is disconnected. This problem can be solved if there is a product having a WLAN controller adapted to control between the APs. However, there arises a problem that this product causes a high cost.

SUMMARY OF THE INVENTION

It is therefore an object of this invention to provide a VoIP terminal speech quality control system and method that can solve the foregoing problems at a low cost, and further provide a program that causes a computer to execute such a method and a recording medium recording such a program.

For accomplishing the foregoing object, this invention employs means having features as described below.

In a first aspect of the invention, there is provided a VoIP terminal speech quality control system in a communication system comprising a LAN (Local Area Network) access point and a VoIP (Voice over IP) terminal. The access point comprises a data storage table for storing a MAC address of a VoIP terminal performing a VoIP communication, holding status information corresponding to the MAC address and indicative of a holding state of the VoIP terminal, and data on the number of in-call terminals, and a CPU that monitors all transmitting/receiving packets of the VoIP terminal connected to a LAN, sequentially compares the transmitting/receiving packets with a bit string of a holding start command set in advance and, when a bit string agreeing with the bit string of the holding start command is detected from the compared packet, stores holding status information of the VoIP terminal included in the packet into the data storage table, but does not change the data on the number of in-call terminals.

In a second aspect of the invention, there is provided a VoIP terminal speech quality control system in a communication system comprising a plurality of LAN access points and a VoIP (Voice over IP) terminal. A handover source access point in the access points comprises a data storage table for storing a MAC address of a VoIP terminal performing a VoIP communication, holding status information corresponding to the MAC address and indicative of a holding state of the VoIP terminal, and data on the number of in-call terminals, and a CPU that monitors all transmitting/receiving frames and packets of the VoIP terminal connected to a LAN so as to judge whether or not the connected VoIP terminal is disconnected at a frame layer and, when the VoIP terminal is disconnected at the frame layer, judges whether or not a MAC address of the VoIP terminal disconnected at the frame layer is stored in the data storage table and whether or not holding status information thereof is stored in the data storage table and, when the MAC address is stored in the data storage table and the holding status information is detected, issues the holding status information as temporary holding status information and sends a holding notification request command including the temporary holding status information to all the access points and, when the VoIP terminal is not disconnected at the frame layer, judges whether or not a holding notification response command is present in the packet and, when the holding notification response command is present, deletes the holding status information and reduces the number of in-call terminals.

In accordance with a specific feature of the second aspect of the invention, a handover destination access point in the access points comprises a data storage table for storing a MAC address of a VoIP terminal performing a VoIP communication, holding status information corresponding to the MAC address and indicative of a holding state of the VoIP terminal, and data on the number of in-call terminals, and a CPU that monitors all transmitting/receiving frames and packets so as to judge whether or not the holding notification request command transmitted to all the access points has been received and, if the holding notification request command is judged to have been received, writes the MAC address and the temporary holding status information of the VoIP terminal in holding present in the holding notification request command into the data storage table and, if the holding notification request command is judged not to have been received, confirms whether or not the MAC address and the temporary holding status information of the VoIP terminal connected at the frame layer are stored and, if judged to be stored, changes the temporary holding status information stored in the data storage table to holding status information, increases the number of in-call terminals, and notifies a holding notification response command to all the access points.

In accordance with another specific feature of the second aspect of the invention, an access point other than the handover destination access point and the handover source access point in the access points comprises a data storage table for storing a MAC address of a VoIP terminal performing a VoIP communication, holding status information corresponding to the MAC address and indicative of a holding state of the VoIP terminal, and data on the number of in-call terminals, and a CPU that monitors all transmitting/receiving packets of the VoIP terminal connected to the LAN so as to judge whether or not the holding notification request command has been received and, if the holding notification request command is judged to have been received, writes the MAC address and the temporary holding status information of the VoIP terminal in holding present in the holding notification request command into the data storage table and, if the holding notification request command is judged not to have been received, confirms whether or not the holding notification response command has been received and, if the holding notification response command is judged to have been received, deletes the MAC address and the temporary holding status information stored in the data storage table.

In a third aspect of the invention, there is provided a VoIP terminal speech quality control method for a communication system comprising a LAN access point and a VoIP terminal. The method comprising the steps of: storing, into a data storage table, a MAC address of a VoIP terminal performing a VoIP communication, holding status information corresponding to the MAC address and indicative of a holding state of the VoIP terminal, and data on the number of in-call terminals; monitoring all transmitting/receiving packets of the VoIP terminal connected to a LAN; sequentially comparing the transmitting/receiving packets with a bit string of a holding start command set in a memory in advance; and when a bit string agreeing with the bit string of the holding start command is detected from the compared packet, storing holding status information of the VoIP terminal included in the packet into the data storage table. Addition to or subtraction from the data on the number of in-call terminals is not performed.

In a fourth aspect of the invention, there is provided a VoIP terminal speech quality control method for a handover source access point in a communication system comprising a plurality of LAN access points and a VoIP (Voice over IP) terminal. The method comprising the steps of; storing, into a data storage table, a MAC address of a VoIP terminal performing a VoIP communication, holding status information corresponding to the MAC address and indicative of a holding state of the VoIP terminal, and data on the number of in-call terminals; monitoring all transmitting/receiving frames and packets of the VoIP terminal connected to a LAN; judging whether or not the connected VoIP terminal is disconnected at a frame layer; when the VoIP terminal is disconnected at the frame layer, judging whether or not a MAC address of the VoIP terminal disconnected at the frame layer is stored in the data storage table and whether or not holding status information thereof is stored in the data storage table; when the MAC address is stored in the data storage table and the holding status information is detected, issuing the holding status information as temporary holding status information and sending a holding notification request command including the temporary holding status information to all the access points; when the VoIP terminal is not disconnected at the frame layer, judging whether or not a holding notification response command is present in the packet; and when the holding notification response command is present, deleting the holding status information and reducing the number of in-call terminals.

In accordance with a specific feature of the fourth aspect of the invention, the method for a handover destination access point in the access points comprises the steps of: storing, into a data storage table, a MAC address of a VoIP terminal performing a VoIP communication, holding status information corresponding to the MAC address and indicative of a holding state of the VoIP terminal, and data on the number of in-call terminals; monitoring all transmitting/receiving frames and packets; judging whether or not the holding notification request command transmitted to all the access points has been received; if the holding notification request command is judged to have been received, writing the MAC address and the temporary holding status information of the VoIP terminal in holding present in the holding notification request command into the data storage table; if the holding notification request command is judged not to have been received, confirming whether or not the MAC address and the temporary holding status information of the VoIP terminal connected at the frame layer are stored; and if judged to be stored, changing the temporary holding status information stored in the data storage table to holding status information, increasing the number of in-call terminals, and notifying a holding notification response command to all the access points.

In accordance with another specific feature of the fourth aspect of the invention, the method for an access point other than the handover destination access point and the handover source access point in the access points comprises the steps of: storing, into a data storage table, a MAC address of a VoIP terminal performing a VoIP communication, holding status information corresponding to the MAC address and indicative of a holding state of the VoIP terminal, and data on the number of in-call terminals; monitoring all transmitting/receiving packets of the VoIP terminal connected to the LAN; judging whether or not the holding notification request command has been received; if the holding notification request command is judged to have been received, writing the MAC address and the temporary holding status information of the VoIP terminal in holding present in the holding notification request command into the data storage table; if the holding notification request command is judged not to have been received, confirming whether or not the holding notification response command has been received; and if the holding notification response command is judged to have been received, deleting the MAC address and the temporary holding status information stored in the data storage table.

DESCRIPTION OF THE PREFERRED EMBODIMENT

Hereinbelow, an embodiment of this invention will be described in detail with reference to the drawings.

Figure 1:
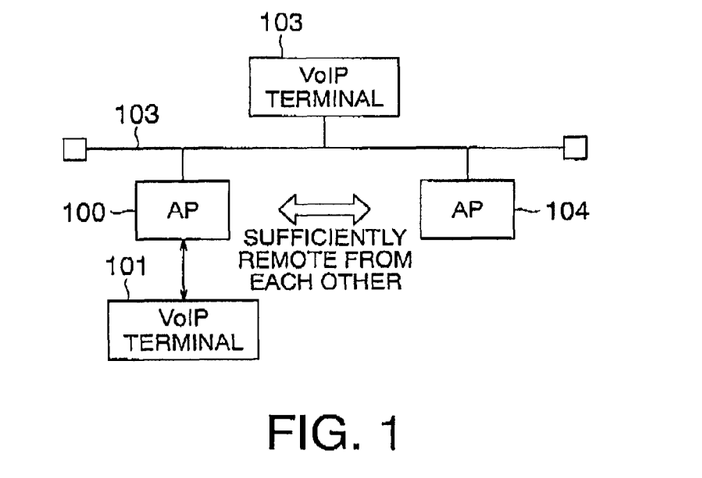
FIG. 1 is a diagram showing the overall structure of a VoIP terminal speech quality control system according to this invention.

Referring to FIG. 1, a VoIP terminal speech quality control system according to this invention comprises program-controlled wireless LAN access points AP 100 and AP 104 (APs 100 and 104 are sufficiently remote from each other) and VoIP terminals 101 (wireless LAN) and 102 (wired LAN) that are VoIP-communicable with each other.

Figure 2:
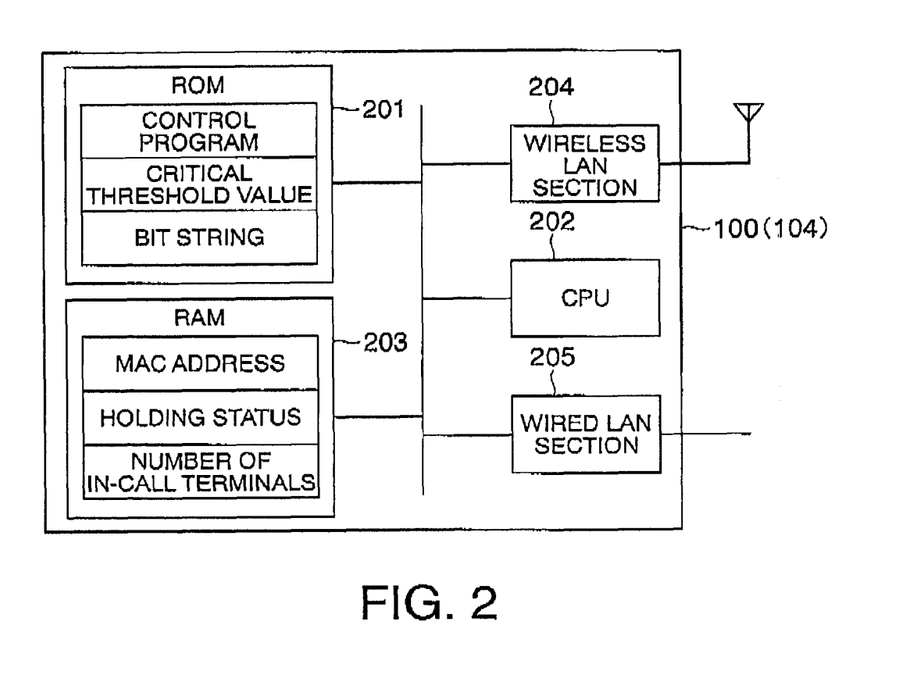
FIG. 2 is a block diagram showing the internal structure of an AP in the VoIP terminal speech quality control system.

Referring to FIG. 2, the AP 100 (or the AP 104) comprises a ROM 201, a CPU 202, a RAM 203, a wireless LAN section 204, and a wired LAN section 205.

The ROM 201 stores a control program and respective setting values. The CPU 202 performs arithmetic processing, such as controlling the number of VoIP calls, based on the control program stored in the ROM 201. The RAM 203 serves as a work area of the CPU 202 and temporarily stores data produced by the execution of the control program. The wireless LAN section 204 has a function based on IEEE802.11 and connects the VoIP terminal 101 by radio to a communication network. The wired LAN section 205 has a function based on IEEE802.3 and connects the VoIP terminal 102 by wire to the communication network.

Now, referring to FIGS. 1 to 7 (FIGS. 3 to 6 are flowcharts), the operation of this embodiment will be described. For convenience sake, SIP will be described as a call control protocol adapted to perform VoIP communication, but this invention is also applicable to another call control protocol such as H.323 or MGCP.

For the sake of explanation, the function of the AP will be described by dividing it into a plurality of functions (FIGS. 3 to 6). However, actually, the same AP includes all the functions.

(Description of Holding and Resumption after the Holding in the same AP)

Figure 3:
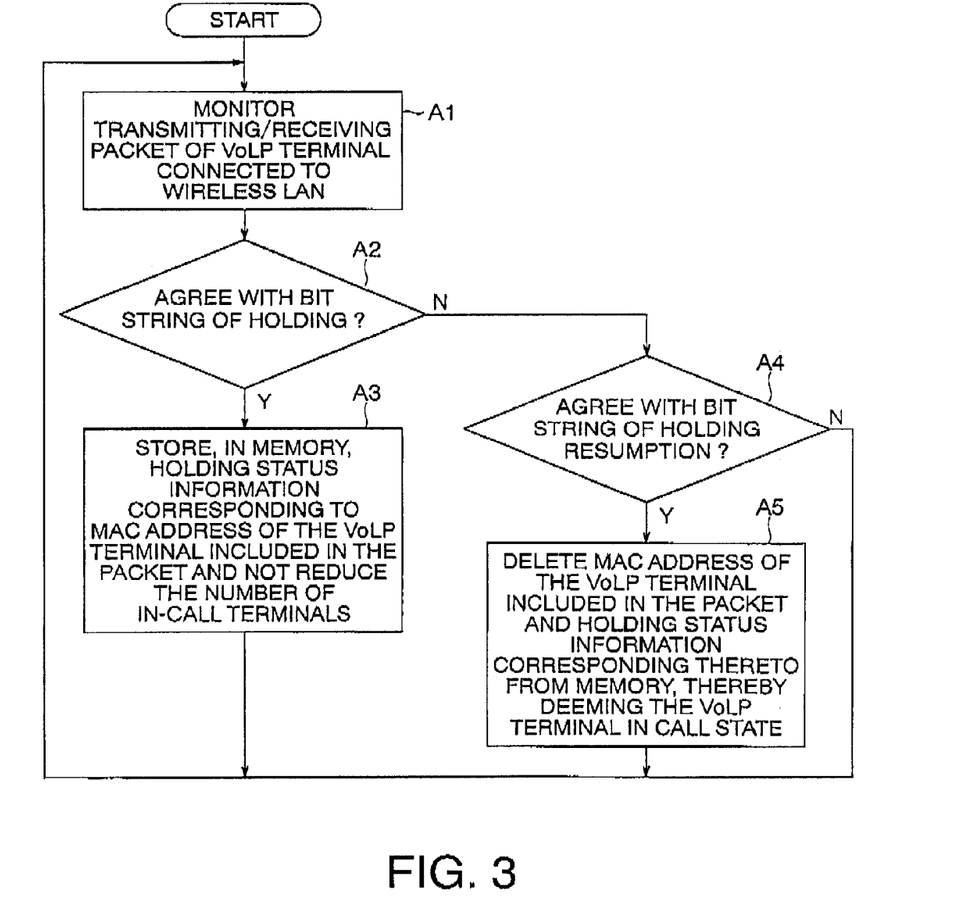
FIG. 3 is a flowchart for explaining operations in holding and resumption subsequent to the holding in the same AP.

The RAM has a holding status information storage table for storing a MAC address of a VoIP terminal connected to the wireless LAN and performing a VoIP communication and holding status information thereof. During a call in progress, blank data is stored as the holding status information in the holding status information storage table.

The AP (100) monitors all transmitting/receiving packets (layer 3) of the VoIP terminal (101) connected to the wireless LAN (FIG. 3—step A1).

The AP (100) sequentially compares the transmitting/receiving packets with a holding command (when SDP media attribute in INVITE is sendonly in the case of SIP) in the form of a bit string preset in the ROM (201) (FIG. 3—step A2).

When both agree with each other as a result of the comparison (YES in step A2), the AP (100) stores, into the RAM, holding status information (information indicative of in-holding) corresponding to a MAC address of the VoIP terminal included in the packet and does not change the number of in-call terminals in the RAM (203). Thereafter, the processing returns to start (FIG. 3—step A3).

When both do not agree with each other as a result of the comparison (NO in step A2), the transmitting/receiving packet is compared with a bit string of holding resumption (resumption after holding) (FIG. 3—step A4). In the case of SIP, it is judged to agree with the bit string of holding resumption when the VoIP terminal is proved to be in holding on the basis of a MAC address in received INVITE and holding status information in the RAM corresponding to the MAC address. In the case of other than SIP, if there is a bit string that can discriminate holding assumption, it may be preset in the ROM (201).

When both agree with each other as a result of the comparison (YES in step A4), the holding status information of the VoIP terminal included in the packet is deleted from the memory and thus the VoIP terminal is deemed In a call state (FIG. 3—step A5). When both do not agree with each other as a result of the comparison (NO in step A4), the processing returns to start.

(Description of Handover Operations for a Terminal during Holding)

Figure 7:
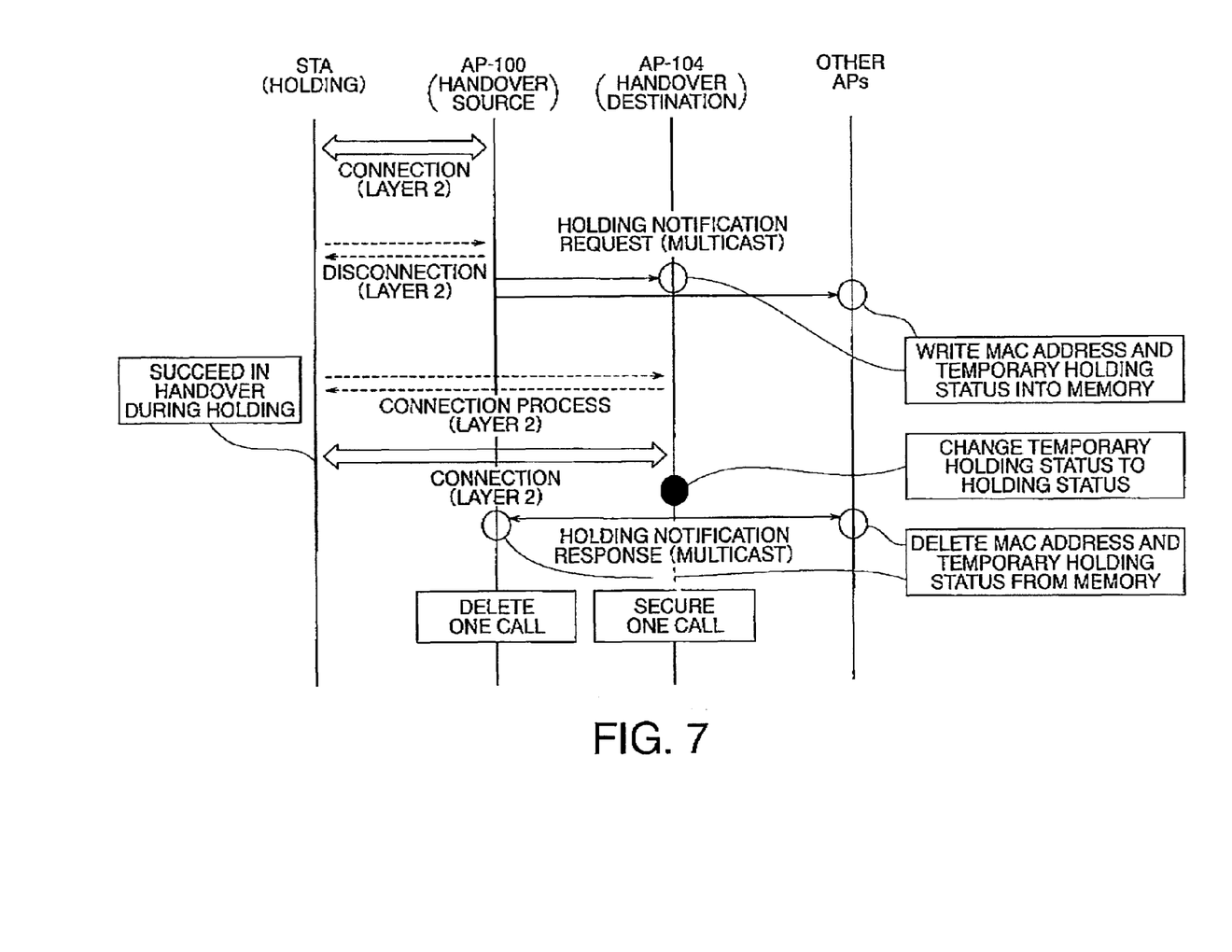
FIG. 7 is a sequence diagram for explaining a sequence of handover operations for a terminal during holding.

Hereinbelow, description will be made of a flow sequence for a VoIP terminal to hand over from the AP (100) to the AP (104) while the VoIP terminal is in holding. FIG. 7 shows a sequence of operations for a VoIP terminal (STA) to hand over from the AP (100) to the AP (104) while the VoIP terminal (STA) is in holding.

(1) Operation of Handover Source AP (100)

Figure 4:
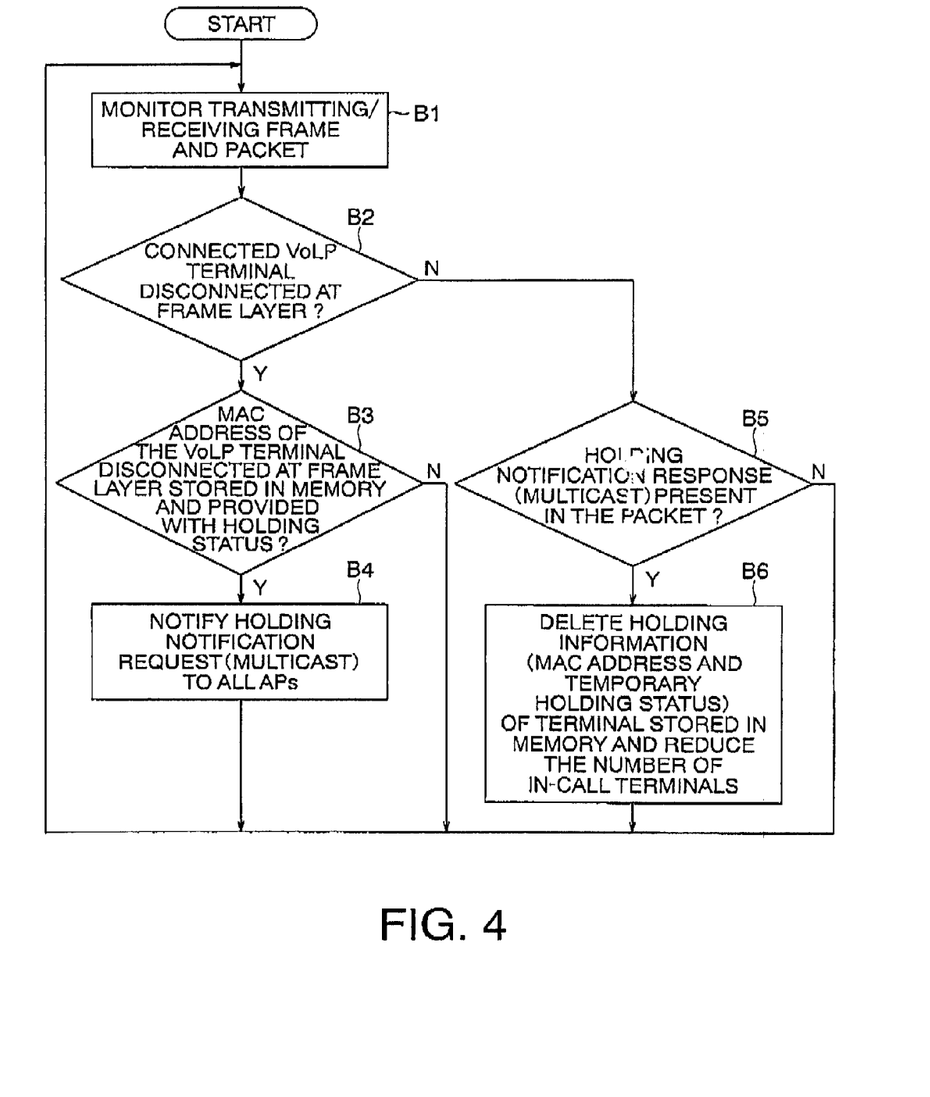
FIG. 4 is a flowchart for explaining operations of a handover source AP.

The RAM has a holding status information storage table for storing a MAC address of a VoIP terminal connected to the wireless LAN and performing a VoIP communication and holding status information thereof. During a call in progress, blank data is stored as the holding status information in the holding status information storage table.

The AP (100) monitors all transmitting/receiving frames (layer 2) of the VoIP terminal (101) connected to the wireless LAN (FIG. 4—step B1) so as to judge whether or not the VoIP terminal is disconnected at a frame layer (layer 2) (FIG. 4—step B2). This judgment is made by judging whether or not the AP has received a Dis-Association frame or a message according to IAPP.

When a result of the judgment is YES (YES in step B2), it is judged whether or not a MAC address of the VoIP terminal disconnected at the frame layer is stored in the RAM and whether or not a holding status thereof is holding (FIG. 4 step B3).

When a result of this judgment is YES (YES in step B3), a holding notification request command (multicast) is notified to all APs and the processing returns to start (FIG. 4—step B4). Herein, the holding notification request is a message including a MAC address of a VoIP terminal in holding and a holding notification request flag in a multicast packet and serves to notify holding information of the terminal, i.e. a MAC address and temporary holding status information, to all APs.

Herein, at the time of handing over from a handover source AP to a handover destination AP, holding status information is issued as temporary holding status information in the handover source AP. This issued temporary holding status information is included in a holding notification request command and sent to all the other APs.

When a result of the judgment is NO (NO in step B2), it is judged whether or not a holding notification response (multicast) is present in the packet (FIG. 4—step B5). Herein, the holding notification response is a message including a MAC address of a VoIP terminal in holding and a holding notification response flag in a multicast packet and serves to notify holding information of the terminal to all APs.

When a result of the judgment is YES (YES in step B5), the holding information (MAC address and temporary holding status information) of the terminal stored in the memory is deleted and the number of in-call terminals is reduced (FIG. 4—step B6). When a result of the judgment in step B3 or B5 is NO, the processing returns to start.

(2) Operation of Handover Destination AP (104)

Figure 5:
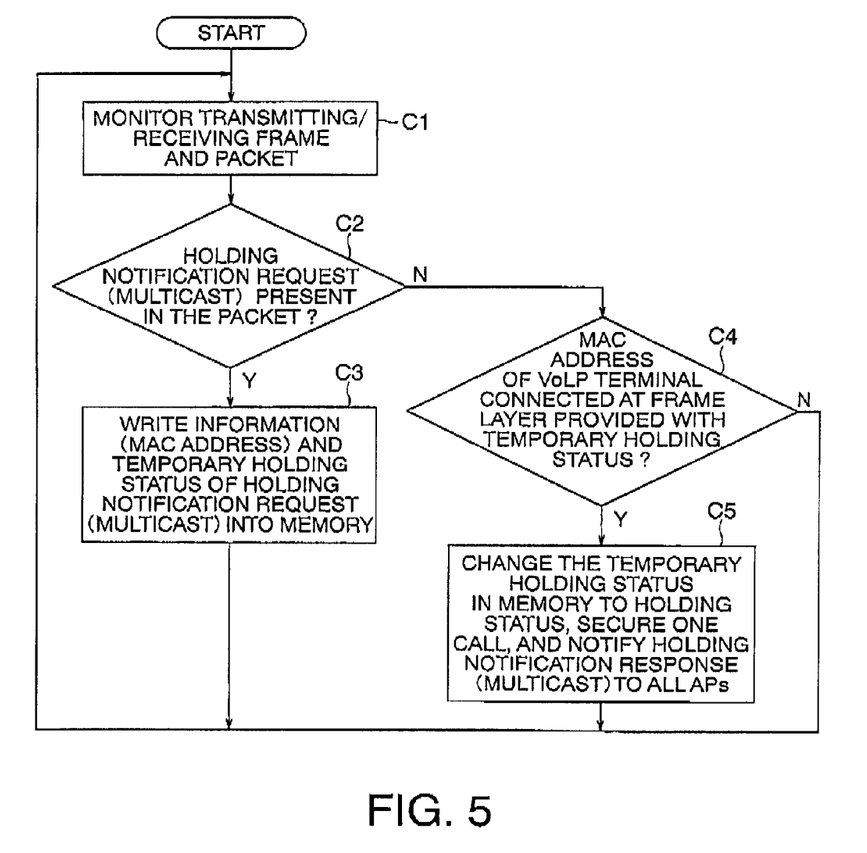
FIG. 5 is a flowchart for explaining operations of a handover destination AP.

The AP (104) monitors all transmitting/receiving frames and packets (FIG. 5—step C1) so as to judge whether or not a holding notification request (multicast) has been received (FIG. 5—step C2). The holding notification request is information transmitted to all APs in step B4 in FIG. 4.

When a result of the judgment is YES (YES in step C2), a MAC address and a temporary holding status of a VoIP terminal in holding included in the holding notification request are written into the RAM (FIG. 5—step C3) and the processing returns to start. However, the number of in-call terminals in the memory is not increased.

When a result of the judgment in step C2 is NO, the AP (104) confirms whether or not a MAC address and a temporary holding status of a VoIP terminal connected at a frame layer (layer 2) are stored in the memory (FIG. 5—step C4). The VoIP terminal connected at the frame layer is a terminal to which the AP sent an Association response.

When a result of the judgment is YES (YES in step C4), the AP (104) changes the temporary holding status in the memory to a holding status, increases the number of in-call terminals (newly secures one call), and notifies a holding notification response (multicast) to all APs. Thereafter, the processing returns to start (FIG. 5—step C5). When a result of the judgment is NO (NO in step C4), the processing returns to start.

(3) Operation of other APs

Figure 6:
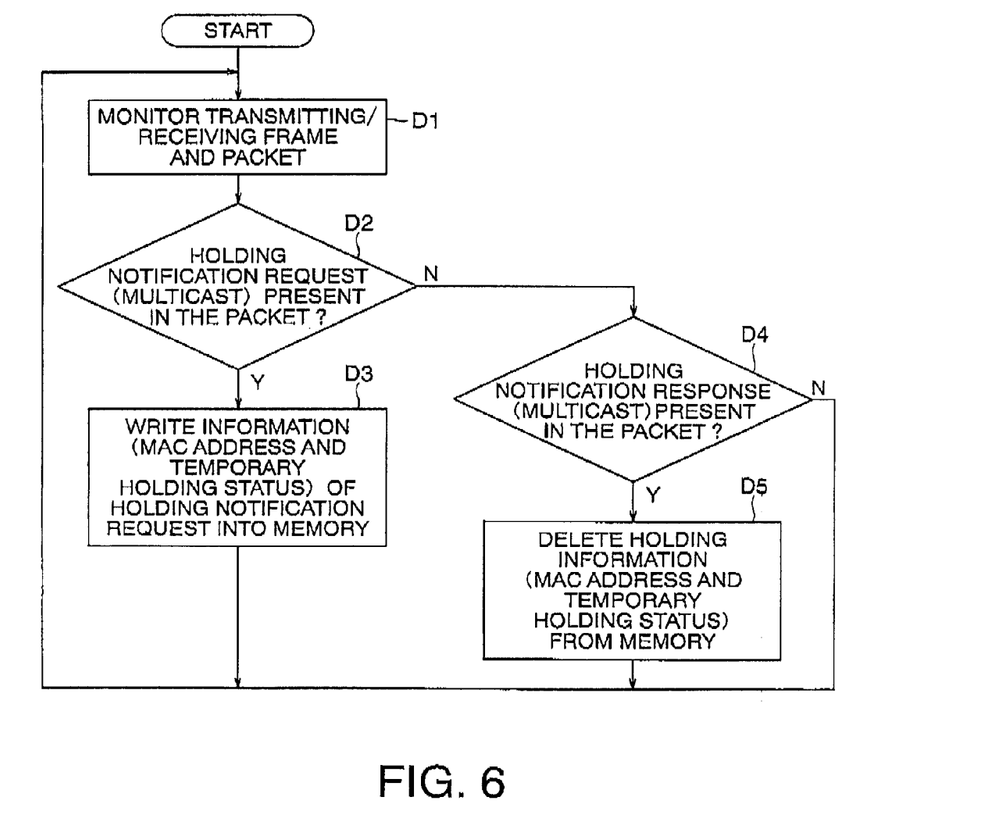
FIG. 6 is a flowchart for explaining operations of other APs.

APs (APs other than 100 and 104) each monitor all transmitting/receiving packets (FIG. 6—step D1) so as to judge whether or not a holding notification request (multicast) has been received (FIG. 6—step D2). The holding notification request is information transmitted to all APs in step B4 in FIG. 4.

When a result of the judgment is YES (YES in step D2), the APs (APs other than 100 and 104) each write, into the memory, a MAC address and a temporary holding status of a VoIP terminal in holding included in the holding notification request (FIG. 6—step D3). Thereafter, the processing returns to start. However, the number of in-call terminals in the memory is not increased.

When a result of the judgment is NO (NO in step D2), the APs (APs other than 100 and 104) each confirm whether or not a holding notification response (multicast) has been received (FIG. 6—step D4).

When a result of the judgment is YES (YES in step D4), the APs (APs other than 100 and 104) each delete the holding information (MAC address and temporary holding status) from the memory (FIG. 6—step D5). Thereafter, the processing returns to start. When a result of the judgment is NO (NO in step D4), the processing returns to start.

The subject of this invention also includes a program that causes computer to execute respective steps in the foregoing VoIP terminal speech quality control method. This program may be the program itself or may be stored in a recording medium readable by the computer.

In this invention, this recording medium may be a program medium such as a memory necessary for the processing in a microcomputer, for example, a ROM, or may be a program medium which is readable when inserted into a program reading apparatus provided as an external storage unit (not shown). In either case, the stored program may be executed through access by the microcomputer. Alternatively, in either case, the program is read and loaded into a program storage area of the microcomputer so as to be executed. A program for this loading is stored in the apparatus body in advance.

Herein, the foregoing program medium is a recording medium configured to be separable from the body and may be a tape such as a magnetic tape or a cassette tape, a magnetic disk such as a FD (flexible disk) or a HD (hard disk), an optical disk such as CD-ROM, MO, MD, or DVD, a card such as an IC card (including a memory card) or an optical card, or a medium fixedly holding the program, including a semiconductor memory such as mask ROM, EPROM, EEPROM, or flash ROM.

Further, in this invention, because of the system structure connectable to the communication network including the Internet, it may also be a medium fluidly holding the program such as downloading the program from the communication network. When downloading the program from the communication network, a program for the downloading may be stored in the apparatus body in advance or may be installed from another recording medium.

Further, in this invention, the program may be the processing itself executed by the microcomputer or may be one that can be or was obtained through access to the communication network including the Internet, or may be one that is sent out from this side.

The foregoing embodiment is only one example in which this invention is suitably carried out, and this invention can be carried out with various modifications without departing from the gist of the invention. For example, the multicast is used as means for notifying the holding status to the other APs, but, if it is possible to know addresses of individual APs, the unicast may be used for notifying the holding notification request and the holding notification response.

According to this invention, since an AP secures a speech band even when a terminal is in holding, the speech quality can be guaranteed without failing in switching back even if the terminal is resumed after the holding.

Further, according to this invention, since a handover destination AP secures a speech band even when a terminal hands over during holding, the speech quality can be guaranteed without failing in switching back even if the terminal is resumed after the holding.

What is claimed is:

1. A VoIP terminal speech quality control system in a communication system comprising a LAN (Local Area Network) access point and a VoIP (Voice over IP) terminal, wherein said access point comprises;

a data storage table for storing a MAC address of a VoIP terminal performing a VoIP communication, holding status information corresponding to said MAC address and indicative of a holding state of said VoIP terminal, and data on the number of in-call terminals; and     a CPU that monitors all transmitting/receiving packets of the VoIP terminal connected to a LAN, sequentially compares the transmitting/receiving packets with a bit string of a holding start command set in advance and, when a bit string agreeing with said bit string of the holding start command is detected from the compared packet, stores holding status information of the VoIP terminal included in said packet into said data storage table, but does not change said data on the number of in-call terminals.

2. A VoIP terminal speech quality control system according to claim 1, wherein when the bit string agreeing with said bit string of the holding start command is not detected from the compared packet as a result of comparing the transmitting/receiving packet with said bit string of the holding start command, said CPU compares said transmitting/receiving packet with a bit string of terminal holding resumption and, when a bit string agreeing with said bit string of the terminal holding resumption is detected from said compared packet, said CPU deletes the holding status information of the VoIP terminal included in said compared packet from said data storage table, so that a call state is maintained.

3. A VoIP terminal speech quality control system according to claim 2, wherein when a communication control protocol is a SIP (Session Initiation Protocol), determination of the holding resumption is judged based on a MAC address in received INVITE and holding status information corresponding to the MAC address and, when in holding, it is judged to agree with the holding resumption bit string.

4. A VoIP terminal speech quality control system according to claim 2, wherein when a communication control protocol is other than a SIP, a bit string capable of discriminating the holding resumption is preset in said data storage table and determination of the holding resumption is judged based on whether or not to agree with said preset bit string.

5. A VoIP terminal speech quality control system in a communication system comprising a plurality of LAN access points and a VoIP (Voice over IP) terminal, wherein a handover source access point in said access points comprises;
    a data storage table for storing a MAC address of a VoIP terminal performing a VoIP communication, holding status information corresponding to said MAC address and indicative of a holding state of said VoIP terminal, and data on the number of in-call terminals; and
    a CPU that monitors all transmitting/receiving frames and packets of the VoIP terminal connected to a LAN so as to judge whether or not the connected VoIP terminal is disconnected at a frame layer and, when said VoIP terminal is disconnected at the frame layer, judges whether or not a MAC address of the VoIP terminal disconnected at the frame layer is stored in said data storage table and whether or not holding status information thereof is stored in said data storage table and, when said MAC address is stored in said data storage table and said holding status information is detected, issues said holding status information as temporary holding status information and sends a holding notification request command including said temporary holding status information to all the access points and, when said VoIP terminal is not disconnected at the frame layer, judges whether or not a holding notification response command is present in the packet and, when said holding notification response command is present, deletes said holding status information and reduces the number of in-call terminals.

6. A VoIP terminal speech quality control system according to claim 5, wherein said holding notification request command is a message including a MAC address of a VoIP terminal in holding and a holding notification request flag in a multicast packet and serves to notify the MAC address and temporary holding status information of said VoIP terminal to all the access points.

7. A VoIP terminal speech quality control system according to claim 5, wherein said holding notification response command is a message including a MAC address of a VoIP terminal in holding and a holding notification response flag in a multicast packet and serves to notify the MAC address and temporary holding status information of said VoIP terminal to all the access points.

8. A VoIP terminal speech quality control system according to claim 5, wherein a handover destination access point in said access points comprises;
    a data storage table for storing a MAC address of a VoIP terminal performing a VoIP communication, holding status information corresponding to said MAC address and indicative of a holding state of said VoIP terminal, and data on the number of in-call terminals; and
    a CPU that monitors all transmitting/receiving frames and packets so as to judge whether or not the holding notification request command transmitted to all the access points has been received and, if said holding notification request command is judged to have been received, writes the MAC address and the temporary holding status information of the VoIP terminal in holding present in said holding notification request command into said data storage table and, if said holding notification request command is judged not to have been received, confirms whether or not the MAC address and the temporary holding status information of the VoIP terminal connected at the frame layer are stored and, if judged to be stored, changes the temporary holding status information stored in said data storage table to holding status information, increases the number of in-call terminals, and notifies a holding notification response command to all the access points.

9. A VoIP terminal speech quality control system according to claim 8, wherein an access point other than the handover destination access point and the handover source access point in said access points comprises;
    a data storage table for storing a MAC address of a VoIP terminal performing a VoIP communication, holding status information corresponding to said MAC address and indicative of a holding state of said VoIP terminal, and data on the number of in-call terminals; and
    a CPU that monitors all transmitting/receiving packets of the VoIP terminal connected to the LAN so as to judge whether or not the holding notification request command has been received and, if said holding notification request command is judged to have been received, writes the MAC address and the temporary holding status information of the VoIP terminal in holding present in said holding notification request command into said data storage table and, if said holding notification request command is judged not to have been received, confirms whether or not the holding notification response command has been received and, if said holding notification response command is judged to have been received, deletes the MAC address and the temporary holding status information stored in said data storage table.

10. A VoIP terminal speech quality control method for a communication system comprising a LAN access point and a VoIP terminal, said method comprising the steps of:
    storing, into a data storage table, a MAC address of a VoIP terminal performing a VoIP communication, holding status information corresponding to said MAC address and indicative of a holding state of said VoIP terminal, and data on the number of in-call terminals;
    monitoring all transmitting/receiving packets of the VoIP terminal connected to a LAN;
    sequentially comparing the transmitting/receiving packets with a bit string of a holding start command set in a memory in advance; and
    when a bit string agreeing with said bit string of the holding start command is detected from the compared packet, storing holding status information of the VoIP terminal included in said packet into said data storage table, and wherein addition to or subtraction from said data on the number of in-call terminals is not performed.

11. A VoIP terminal speech quality control method for a handover source access point in a communication system comprising a plurality of LAN access points and a VoIP (Voice over IP) terminal, said method comprising the steps of:
storing, into a data storage table, a MAC address of a VoIP terminal performing a VoIP communication, holding status information corresponding to said MAC address and indicative of a holding state of said VoIP terminal, and data on the number of in-call terminals;
monitoring all transmitting/receiving frames and packets of the VoIP terminal connected to a LAN;
judging whether or not the connected VoIP terminal is disconnected at a frame layer;
when said VoIP terminal is disconnected at the frame layer, judging whether or not a MAC address of the VoIP terminal disconnected at the frame layer is stored in said data storage table and whether or not holding status information thereof is stored in said data storage table;
when said MAC address is stored in said data storage table and said holding status information is detected, issuing said holding status information as temporary holding status information and sending a holding notification request command including said temporary holding status information to all the access points;
when said VoIP terminal is not disconnected at the frame layer, judging whether or not a holding notification response command is present in the packet; and
when said holding notification response command is present, deleting said holding status information and reducing the number of in-call terminals.

12. A VoIP terminal speech quality control method according to claim 11, wherein said method for a handover destination access point in said access points comprises the steps of:
storing, into a data storage table, a MAC address of a VoIP terminal performing a VoIP communication, holding status information corresponding to said MAC address and indicative of a holding state of said VoIP terminal, and data on the number of in-call terminals;
monitoring all transmitting/receiving frames and packets;
judging whether or not the holding notification request command transmitted to all the access points has been received;
if said holding notification request command is judged to have been received, writing the MAC address and the temporary holding status information of the VoIP terminal in holding present in said holding notification request command into said data storage table;
if said holding notification request command is judged not to have been received, confirming whether or not the MAC address and the temporary holding status information of the VoIP terminal connected at the frame layer are stored; and
if judged to be stored, changing the temporary holding status information stored in said data storage table to holding status information, increasing the number of in-call terminals, and notifying a holding notification response command to all the access points.

13. A VoIP terminal speech quality control method according to claim 12, wherein said method for an access point other than the handover destination access point and the handover source access point in said access points comprises the steps of:
storing, into a data storage table, a MAC address of a VoIP terminal performing a VoIP communication, holding status information corresponding to said MAC address and indicative of a holding state of said VoIP terminal, and data on the number of in-call terminals;
monitoring all transmitting/receiving packets of the VoIP terminal connected to the LAN;
judging whether or not the holding notification request command has been received;
if said holding notification request command is judged to have been received, writing the MAC address and the temporary holding status information of the VoIP terminal in holding present in said holding notification request command into said data storage table;
if said holding notification request command is judged not to have been received, confirming whether or not the holding notification response command has been received; and
if said holding notification response command is judged to have been received, deleting the MAC address and the temporary holding status information stored in said data storage table.

14. A computer-readable non-transitory storage medium storing a program causing a computer to execute the steps of:
storing, into a data storage table, a MAC address of a VoIP terminal performing a VoIP communication with a LAN access point, holding status information corresponding to said MAC address and indicative of a holding state of said VoIP terminal, and data on the number of in-call terminals;
monitoring all transmitting/receiving packets of the VoIP terminal connected to a LAN;
sequentially comparing the transmitting/receiving packets with a bit string of a holding start command set in a memory in advance; and
when a bit string agreeing with said bit string of the holding start command is detected from the compared packet, storing holding status information of the VoIP terminal included in said packet into said data storage table.

15. A computer-readable non-transitory storage medium storing a program causing a computer to execute the steps of:
storing, into a data storage table, a MAC address of a VoIP terminal performing a VoIP communication with a handover source access point, holding status information corresponding to said MAC address and indicative of a holding state of said VoIP terminal, and data on the number of in-call terminals;
monitoring all transmitting/receiving frames and packets of the VoIP terminal connected to a LAN;
judging whether or not the connected VoIP terminal is disconnected at a frame layer;
when said VoIP terminal is disconnected at the frame layer, judging whether or not a MAC address of the VoIP terminal disconnected at the frame layer is stored in said data storage table and whether or not holding status information thereof is stored in said data storage table;
when said MAC address is stored in said data storage table and said holding status information is detected, sending a holding notification request command to all access points;
when said VoIP terminal is not disconnected at the frame layer, judging whether or not a holding notification response command is present in the packet; and
when said holding notification response command is present, deleting said holding status information and reducing the number of in-call terminals.

16. A computer-readable non-transitory storage medium storing a program according to claim 15, wherein said program causes the computer to execute the steps of:

storing, into a data storage table, a MAC address of a VoIP terminal performing a VoIP communication with a handover destination access point, holding status information corresponding to said MAC address and indicative of a holding state of said VoIP terminal, and data on the number of in-call terminals;

monitoring all transmitting/receiving frames and packets;

judging whether or not the holding notification request command transmitted to all the access points has been received;

if said holding notification request command is judged to have been received, writing the MAC address and the temporary holding status information of the VoIP terminal in holding present in said holding notification request command into said data storage table;

if said holding notification request command is judged not to have been received, confirming whether or not the MAC address and the temporary holding status information of the VoIP terminal connected at the frame layer are stored; and if judged to be stored, changing the temporary holding status information stored in said data storage table to holding status information, increasing the number of in-call terminals, and notifying a holding notification response command to all the access points.

17. A computer-readable non-transitory storage medium storing a program according to claim 16, wherein said program causes the computer to execute the steps of:

storing, into a data storage table, a MAC address of a VoIP terminal performing a VoIP communication with an access point other than the handover destination access point and the handover source access point in said access points, holding status information corresponding to said MAC address and indicative of a holding state of said VoIP terminal, and data on the number of in-call terminals;

monitoring all transmitting/receiving packets of the VoIP terminal connected to the LAN;

judging whether or not the holding notification request command has been received;

if said holding notification request command is judged to have been received, writing the MAC address and the temporary holding status information of the VoIP terminal in holding present in said holding notification request command into said data storage table;

if said holding notification request command is judged not to have been received, confirming whether or not the holding notification response command has been received; and if said holding notification response command is judged to have been received, deleting the MAC address and the temporary holding status information stored in said data storage table.

* * * * *